A. G. STOREY & T. J. LEWIS.
Lamp.
No. 160,848. Patented March 16, 1875.
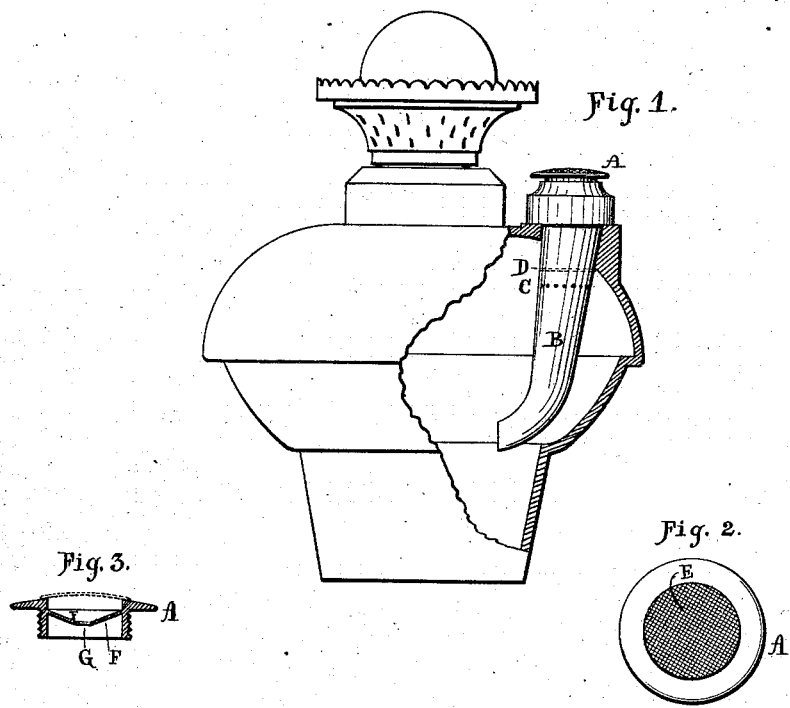

UNITED STATES PATENT OFFICE.

ALBERT G. STOREY AND THOMAS J. LEWIS, OF BROOKLYN, NEW YORK.

IMPROVEMENT IN LAMPS.

Specification forming part of Letters Patent No. 160,848, dated March 16, 1875; application filed January 14, 1875.

*To all whom it may concern:*

Be it known that we, ALBERT G. STOREY and THOMAS J. LEWIS, of Brooklyn, in the county of Kings and State of New York, have invented a certain Improvement in Kerosene-Oil Lamps, of which the following is a specification:

The object of this invention is to prevent explosion in kerosene-oil lamps, to promote a more perfect combustion of the fluid, and to afford a safe and convenient mode for supplying the lamp with oil while the lamp is burning.

In the accompanying drawing, forming a part hereof, Figure 1 is a part sectional view of a lamp containing my improvements. Figs. 2 and 3 show details of the invention.

B is a metal tube, curved to suit the shape of the lamp, and attached thereto, extending well down into the same. The part of the tube outside of the lamp is provided with a screw-cap, A, (shown in Figs. 2 and 3,) which cap is covered by a wire-gauze, E, and provided also with an interior concave plate, F, having a perforation, G. At D is placed, within the tube B, a wire-gauze partition, below which is a series of perforations, C.

The effect of the operation of the tube B with its details, as described, is to supply the fluid with oxygen, to admit air gradually to the lower region of the lamp, and thereby keep the oil at an even temperature, and also to prevent danger of explosion, either during the ordinary use of the lamp, or when it is being filled with oil. The perforated concave plate F breaks the rapid flow of air to the lower part of the lamp, as does the gauze partition D, which is also the means of preventing a flame from without reaching the oil in the lamp. The series of perforations C allow a current of air to pass over the surface of the oil, which it is intended shall be somewhat below this point. By this means the upper region of the lamp-vessel is kept comparatively cool, and safety thereby promoted.

The constant and regular supply of oxygen to the fluid, and the even temperature at which it is maintained, tend, we find, to effect a very satisfactory result in the illuminating power of the oil. It is seen that the inconvenient necessity of extinguishing the light when oil is to be supplied to the lamp (which necessity exists in the employment of lamps in common use) is, by this invention, entirely obviated.

Having described our invention, we claim as new and wish to secure by Letters Patent—

1. In a lamp, the combination of the tube B, extending within the lamp-vessel, and cover A, provided with the gauze top E and perforated concave plate F, substantially as herein specified.

2. The tube B, provided with the gauze partition D and series of perforations C, combined with the screw-cap A E F G, all arranged as a part of a lamp, substantially as and for the purposes herein specified.

ALBERT G. STOREY.
THOMAS J. LEWIS.

Witnesses:
H. F. BARTNETT,
GEO. A. LACAS.